United States Patent [19]

Mutoh et al.

[11] Patent Number: 5,106,535
[45] Date of Patent: Apr. 21, 1992

[54] DEFOAMING COMPOSITION

[75] Inventors: Teiichi Mutoh; Nobuyuki Terae; Masaki Tanaka, all of Gunma, Japan

[73] Assignee: Shin-Etsu Chemical Company, Limited, Tokyo, Japan

[21] Appl. No.: 470,465

[22] Filed: Jan. 26, 1990

[30] Foreign Application Priority Data

Jan. 27, 1989 [JP] Japan .................................. 1-19184

[51] Int. Cl.$^5$ ............................................. B01D 19/04
[52] U.S. Cl. .................................... 252/358; 252/321
[58] Field of Search ................................ 252/321, 358

[56] References Cited

U.S. PATENT DOCUMENTS

| | | | |
|---|---|---|---|
| 3,746,653 | 7/1973 | Churchfield | 252/321 |
| 3,785,935 | 1/1974 | Householder et al. | 252/358 X |
| 3,856,701 | 12/1974 | Householder | 252/358 |
| 3,984,200 | 10/1976 | Doesberg | 252/321 X |
| 3,984,347 | 10/1976 | Keil | 252/321 |
| 4,010,110 | 3/1977 | Consentino et al. | 252/321 X |
| 4,028,218 | 6/1977 | Fink et al. | 252/321 |
| 4,042,528 | 8/1977 | Abe | 252/358 |
| 4,076,648 | 2/1978 | Rosen | 252/358 |
| 4,183,820 | 1/1980 | Theile et al. | 252/358 X |
| 4,395,352 | 7/1983 | Kulkarni et al. | 252/321 |
| 4,804,737 | 2/1989 | Berger et al. | 252/321 X |
| 4,961,877 | 10/1990 | Shimizu et al. | 252/258 |

OTHER PUBLICATIONS

Derwent Abstract, 73-19285u/14.
Japanese Abstracts, 55-161850, vol. 5, No. 35, (Mar. 5, 1981).

Primary Examiner—Robert L. Stoll
Assistant Examiner—Daniel S. Metzmaier
Attorney, Agent, or Firm—Millen, White & Zelano

[57] ABSTRACT

The silicone-based defoaming composition of the invention comprises (a) a polyoxyalkylene group-substituted organopolysiloxane, (b) a dimethyl silicone fluid and (c) a finely divided silica powder. Different from conventional similar compositions, the polyoxyalkylene groups in the component (a) are bonded to the silicon atoms only in the monofunctional siloxy groups and the component (a) necessarily has trifunctional siloxane units. By virtue of this unique formulation, the inventive defoaming composition added to a foaming liquid is very stable against flocculation even at a high temperature and even in the presence of an inorganic salt in a high concentration in the foaming liquid, e.g., dyeing bath.

8 Claims, No Drawings

DEFOAMING COMPOSITION

BACKGROUND OF THE INVENTION

The present invention relates to a novel defoaming composition or, more particularly, to a silicone-based defoaming composition which is outstandingly stable even at a relatively high temperature and free from the troubles of flocculation in the foaming aqueous bath even by the addition of an inorganic salt in a high concentration to the foaming bath and unevenness in dyeing when the foaming liquid is a dyeing bath containing a dye.

As is well known, silicone-based defoaming agents in general, among various types of defoaming agents, have excellent characteristics that a remarkable defoaming effect can be obtained with a very small amount of addition of, e.g., 10 to 200 ppm, to the foaming liquid in addition to the advantages in the chemical inertness with excellent resistance against heat and chemicals not to react with the foaming substance under very adverse conditions. Moreover, silicone-based defoaming agents are free from the problem in the disposal of waste materials which sometimes cause serious environmental pollution. Therefore, silicone-based defoaming agents are widely employed in a variety of industrial processes by taking advantage of these features.

The above mentioned silicone-based defoaming agent is in the form of an oil compound prepared by compounding a silicone fluid such as dimethyl polysiloxane, methyl phenyl polysiloxane, methyl vinyl polysiloxane and the like with a finely divided silica filler or an aqueous emulsion prepared by dispersing the above mentioned oil compound in water by using a suitable surface active agent as an emulsifier.

Needless to say, defoaming of a dyeing bath is one of the most important applications of silicone-based defoaming agents. It is taught in Japanese Patent Kokai 49-25283 that a silicone-based defoaming agent particularly effective in defoaming of an aqueous dyeing bath can be obtained by compounding a finely divided silica filler, a first organopolysiloxane which is a dimethyl polysiloxane and a second organopolysiloxane which basically is a dimethyl polysiloxane but having at least one polyoxyalkylene group bonded to the silicon atom in the molecular chain terminal or at an intermediate position in the molecular chain. It is also known that an aqueous dyeing bath is sometimes admixed with an inorganic salt such as sodium sulfate and soda ash with an object to improve the efficiency of dyeing.

A problem in the above described dyeing process by the addition of a silicone-based defoaming agent to a dyeing bath containing an inorganic salt is that, when the concentration of the inorganic salt is increased or, for example, the concentration of sodium sulfate is in the range from 20 to 30 g/liter or higher, the constituents of the defoaming agent and the dye in the dyeing bath sometimes cause flocculation and separation from the aqueous medium resulting in unevenness in dyeing. This undesirable phenomenon is more remarkable at a higher temperature of the bath so that the dyeing process using a silicone-based defoaming agent is performed usually at 30° to 45° C. in order to avoid flocculation.

A proposal has been made in order to solve the above mentioned problem of flocculation in a dyeing bath at high temperatures in the presence of an inorganic salt by using copolymeric polyoxyethylene-polyoxypropylene groups as the polyoxyalkylene group in the above mentioned polyoxyalkylene group-substituted organopolysiloxane as the principal ingredient of the defoaming agent with a relatively high molar fraction of the oxyethylene units. A problem in this way of improvement is that the dispersibility of the finely divided silica filler in the silicone fluid is decreased by increasing the molar fraction of the oxyethylene units resulting in decreased stability of the emulsion by dilution or under a condition of mechanical working so that no practically useful defoaming agent can be obtained. Accordingly, it is eagerly desired to develop a novel and improved silicone-based defoaming agent having high stability and free from the problem of flocculation even by the addition of a large amount of an inorganic salt to the foaming liquid.

SUMMARY OF THE INVENTION

The present invention accordingly has an object to provide a novel and improved silicone-based defoaming composition which is outstandingly stable and free from the problem of flocculation even at a relatively high temperature and in the presence of an inorganic salt in a high concentration in the foaming liquid such as a dyeing bath.

Thus, the silicone-based defoaming composition of the present invention is a blend comprising:

(a) 100 parts by weight of a first organopolysiloxane represented by the average unit formula $$(R_3SiO_{0.5})_x(GR_2SiO_{0.5})_y(RSiO_{1.5})_z(R_2SiO)_w, \qquad (I)$$

in which R is a monovalent hydrocarbon group having 1 to 10 carbon atoms, G is a polyoxyalkylene group represented by the general formula $$-R^1{}_p-O-(-C_2H_4-O-)_q-(-R^2-O-)_r-A, \qquad (II)$$

$R^1$ being a divalent hydrocarbon group having 2 to 10 carbon atoms, $R^2$ being a divalent hydrocarbon group having 3 to 10 carbon atoms, A being a hydrogen atom, a monovalent hydrocarbon group having 1 to 10 carbon atoms or an acyl group, p being 0 or 1, q being a positive integer not exceeding 100 and r being 0 or a positive integer not exceeding 50, x is a positive number in the range from 1 to 30, y is a positive number in the range from 1 to 30, z is a positive number in the range from 1 to 50 and w is a positive number in the range from 1 to 300;

(b) from 1 to 100 parts by weight of a second organopolysiloxane represented by the average unit formula $$R_aSiO_{(4-a)/2}, \qquad (III)$$

in which R is a monovalent hydrocarbon group having 1 to 10 carbon atoms and the subscript a is a positive number smaller than 3; and (c) from 0.05 to 25 parts by weight of a finely divided silica powder.

DETAILED DESCRIPTION OF THE PREFERRED EMBODIMENTS

As is described above, the essential ingredients in the inventive defoaming composition are the components (a), (b) and (c), of which the most characteristic is the component (a). This component (a) is basically a polyoxyalkylene group-substituted organopolysiloxane but it is characterized in that, different from conventional polyoxyalkylene group-substituted organopolysiloxanes, the polyoxyalkylene groups, denoted by G, are bonded to the silicon atoms only in the monofunctional siloxy groups in the form of the unit formula ($GR_2SiO_{0.5}$) and that the organopolysiloxane contains trifunctional siloxane units of the formula ($RSiO_{1.5}$). By virtue of the formulation of this unique polyoxyalkylene group-substituted organopolysiloxane, the inventive defoaming composition is very stable against flocculation even at a high temperature of 70° to 85° C. and in the presence of an inorganic salt, e.g., sodium sulfate, in a high concentration of 60 to 70 g/liter in a dyeing bath.

In the above given average unit formula (I) by which the component (a) is represented, the symbol R denotes a monovalent hydrocarbon group having 1 to 10 carbon atoms selected from the class consisting of alkyl groups, e.g., methyl, ethyl, propyl, butyl and octyl groups, cycloalkyl groups, e.g., cyclohexyl group, alkenyl groups, e.g., vinyl and allyl groups, and aryl groups, e.g., phenyl and tolyl gropups, as well as those substituted monovalent hydrocarbon groups obtained by replacing a part or all of the hydrogen atoms in the above named hydrocarbon groups with halogen atoms, cyano groups and the like, e.g., chloromethyl, 3,3,3-trifluoropropyl and 2-cyanoethyl groups. It is optional that this first organopolysiloxane has two kinds or more of these groups in the same molecules. The group denoted by G is a polyoxyalkylene group represented by the general formula (II) given above, in which $R^1$ is a divalent hydrocarbon group having 2 to 10 carbon atoms such as ethylene, propylene, isopropylene, butylene and isobutylene groups, $R^2$ is a divalent hydrocarbon group having 3 to 10 carbon atoms such as propylene, isopropylene, butylene and isobutylene groups, A is a hydrogen atom, a monovalent hydrocarbon group having 1 to 10 carbon atoms or an acyl group, e.g., acetyl and propionyl groups, the subscript p is zero or 1, the subscript q is a positive integer not exceeding 100 and the subscript r is zero or a positive integer not exceeding 50. The subscripts x, y, z and w in the formula (I) are each a positive number in the range from 1 to 30, 1 to 30, 1 to 50 and 1 to 300, respectively.

It is preferable that the ratio of the molecular weight fraction $M^E$ for the polyoxyalkylene groups G to the overall molecular weight $M^T$ of the organopolysiloxane represented by the average unit formula (I), i.e. $M^E:M^T$, is in the range from 0.05 to 0.8 or, more preferably, from 0.1 to 0.8 although it is not always necessary that a single kind of the polyoxyalkylene-substituted organopolysiloxane satisfies such a requirement but the requirement is satisfied by a combination of two kinds or more of different polyoxyalkylene-substituted organopolysiloxanes.

Particular examples of the first organopolysiloxane represented by the average unit formula (I) include those expressed by the following formulas, denoting a methyl group by a symbol Me:

where $G^1$ is $HO(C_2H_4O)_{10}(CH_2)_3-$;

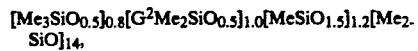

where $G^2$ is $MeO(C_2H_4O)_{10}(C_3H_6O)_{20}(CH_2)_3-$;

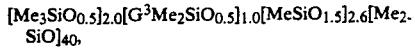

where $G^3$ is $C_4H_9O(C_2H_4O)_{25}(C_3H_6O)_{25}(CH_2)_3-$; and

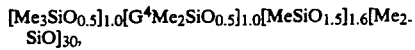

where $G^4$ is $MeCOO(C_2H_4O)_{25}(C_3H_6O)_{25}(CH_2)_3-$.

The polyoxyalkylene groups in the above described organopolysiloxanes can be introduced by a known method utilizing the so-called hydrosilation reaction in which an organopolysiloxane compound having hydrogen atoms directly bonded to the silicon atoms are subjected to an addition reaction with a polyoxyalkylene compound having a vinyl or allyl group at one of the molecular chain terminals in the presence of a platinum compound as a catalyst.

The second organopolysiloxane as the component (b) is represented by the average unit formula (III) given above, in which R has the same meaning as defined above and the subscript a is a positive number smaller than 3 or, preferably, in the range from 0.5 to 2.5 or, more preferably, in the range from 1.0 to 2.2. Examples of such an organopolysiloxane suitable as the component (b) include those expressed by the following formulas, denoting methyl, ethyl, phenyl and hexyl groups by the symbols Me, Et, Ph and Hx, respectively:

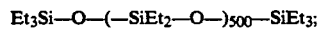

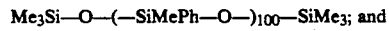

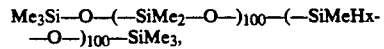

of which dimethyl polysiloxanes are preferred.

These organopolysiloxanes can be prepared by a method well known in the art, for example, by the siloxane rearrangement reaction of a cyclic or linear oligomeric organopolysiloxane in the presence of an acidic or alkaline catalyst to effect equilibration.

The amount of the second organopolysiloxane described above as the component (b) in the inventive defoaming composition is in the range from 1 to 100 parts by weight or, preferably, from 2 to 60 parts by weight per 100 parts by weight of the first organopolysiloxane as the component (a). When the amount of the component (b) is too small, the defoaming activity of the composition is poor. When the amount thereof is too large, on the other hand, the dispersibility of the composition in the foaming liquid is somewhat decreased to affect the defoaming activity.

The component (c) compounded with the above described organopolysiloxanes to give the inventive defoaming composition is a finely divided silica powder which is a well known material in the industry of silicones as a reinforcing filler in silicone rubber compositions including wet-process silica fillers and dry-process silica fillers, optionally, imparted with hydrophobicity on the surface by a treatment with a suitable hydrophobic reagent. It is preferable to use a silica powder having a specific surface area of at least 50 $m^2/g$ as determined by the BET method.

The amount of the finely divided silica powder described above as the component (c) in the inventive defoaming composition is in the range from 0.05 to 25 parts by weight or, preferably, from 0.1 to 20 parts by weight per 100 parts by weight of the first oranopolysiloxane as the component (a). When the amount of the component (c) is outside the above mentioned range, the defoaming power of the composition is decreased.

The defoaming composition of the invention can be prepared by uniformly blending each a specified amount of the above described components (a), (b) and (c) by using a suitable blending machine. As compared with a conventional silicone-based self-emulsifiable defoaming agent composed of a dimethyl polysiloxane, hydrophilic organopolysiloxane and hydrophilic polyoxyalkylene compound, the thus prepared inventive defoaming composition can exhibit a superior defoaming power as well as durability of the power not only at room temperature but also at elevated temperatures. Further, the inventive defoaming composition is free from the trouble of flocculation even in a foaming dyeing bath in which the concentration of an inorganic salt exceeds the upper limit above which the trouble of flocculation unavoidably takes place with conventional silicone-based defoaming agents. In addition, the critical temperature, above which a trouble of flocculation takes place in a defoamed bath is by more than 40° C. higher with the inventive defoaming composition than with conventional silicone-based defoaming agents.

Accordingly, the inventive defoaming composition is particularly useful for defoaming of a dyeing bath in which an inorganic salt is added in a large concentration. Namely, the inventive defoaming composition is free from the troubles in dyeing ascribable to defoaming agents such as flocculation even at an elevated temperature and uneven dyeing or appearance of oil spots on the dyed fabric materials. In addition, the inventive defoaming composition has excellent stability and inertness to other chemicals so that it can be used as an additive in various foaming liquids including oiling agents, aqueous cutting oils, anti-freeze coolant in automobile engines and the like.

In the following, examples and comparative examples are given to illustrate the invention in more detail as preceded by the description of the synthetic procedure for the preparation of the polyoxyalkylene-substituted organopolysiloxanes used as the component (a) in the inventive defoaming compositions. The term of "parts" appearing in the following description always refers to "parts by weight" and the values of viscosity are all those obtained by the measurement at 25° C. The evaluation of the defoaming compositions in the examples and comparative examples was conducted for the following items in the manner described below.

Defoaming Power

A 100 ml volume of a foaming liquid, which was a 1% by weight aqueous solution of a polyoxyethylene nonylphenyl ether, was taken in a graduated cylinder of 200 ml capacity and 50 mg of the defoaming composition were added thereto. The graduated cylinder as stopped was shaken for 5 minutes at room temperature on a wrist-action shaker operating at a frequency of 250 cycles per minute to determine the volume of the foams in ml formed above the liquid surface.

Stability Against Dilution

The defoaming composition was added to water in an amount of 1% by weight and 1000 g of the aqueous solution was vigorously agitated for 30 seconds in a mixer for kitchen work to determine the amount of the oily matter floating on the surface.

Compatibility With Sodium Sulfate

Anhydrous sodium sulfate in a powdery form was gradually added to a 1% by weight aqueous solution of the defoaming composition under agitation to record the concentration of the sodium sulfate added to the solution when flocculation first took place in the solution.

Flocculation Temperature

A 1% by weight aqueous solution of the defoaming composition was gradually heated at a rate of 10° C./minute to record the temperature of the solution when flocculation first took place therein.

SYNTHETIC PREPARATION 1

A mixture composed of 190.0 g of hexamethyl disiloxane, 157.2 g of 1,1,3,3-tetramethyl disiloxane, 351.0 g of a hydrolysis product of methyl trichlorosilane and 1302.0 g of octamethyl cyclotetrasiloxane was admixed with 100 g of concentrated sulfuric acid and the mixture was agitated for 8 hours at room temperature to effect the reaction followed by the addition of 40 g of water, neutralization by adding 200 g of sodium hydrogen carbonate and filtration to give 1900 g of an oily product, referred to as H-1 hereinbelow, having a viscosity of 25 centistokes, which was an organopolysiloxane expressed by the average unit formula

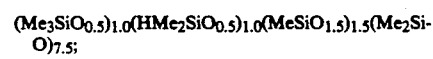

in which Me is a methyl group.

In the next place, 1195 g of H-1 and 805 g of a polyoxyethylene glycol monoallyl ether of the formula

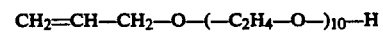

were added to 1000 g of toluene with addition of 0.2 g of an isopropyl alcohol solution of chloroplatinic acid in a concentration of 2% as platinum and the mixture was heated at 115° to 118° C. for 8 hours followed by stripping of the solvent by heating at 120° C. under a reduced pressure of 10 mm Hg to give 1800 g of a product, which is referred to as E-1 hereinbelow, having a viscosity of 120 centistokes. This product was a polyoxyethylene-substituted organopolysiloxane expressed by the average unit formula

in which $G^1$ is a polyoxyethylene group expressed by the formula $HO(C_2H_4O)_{10}(CH_2)_3-$.

SYNTHETIC PREPARATION 2

The synthetic procedure was substantially the same as in Synthetic Preparation 1 described above except that, instead of the polyoxyethylene glycol monoallyl ether, 1494.3 g of a polyoxyethylene-polyoxypropylene glycol monoallyl monomethyl ether of the formula

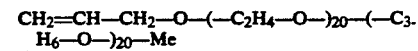

were reacted with 506.6 g of H-1 to give 1800 g of a product, which is referred to as E-2 hereinbelow, having a viscosity of 1200 centistokes. This product was a polyoxyalkylene-substituted organopolysiloxane expressed by the average unit formula $$\{Me_3SiO_{0.5}\}_{1.0}\{G^5Me_2SiO_{0.5}\}_{1.0}(MeiO_{1.5})_{1.5}(Me_2SiO)_{7.5};$$

in which $G^5$ is a polyoxyalkylene group expressed by the formula $MeO(C_2H_4O)_{20}(C_3H_6O)_{20}(CH_2)_3-$.

SYNTHETIC PREPARATION 3

A mixture composed of 101.8 g of hexamethyl disiloxane, 84.2 g of 1,1,3,3-tetramethyl disiloxane, 187.8 g of a hydrolysis product of methyl trichlorosilane and 1626.4 g of octamethyl cyclotetrasiloxane was subjected to the siloxane rearrangement reaction in substantially the same manner as in Synthetic Preparation 1 described above to give 1900 g of an oily product, referred to as H-2 hereinbelow, having a viscosity of 45 centistokes, which was an organopolysiloxane expressed by the average unit formula $$(Me_3SiO_{0.5})_{1.0}(HMe_2SiO_{0.5})_{1.0}(MeSiO_{1.5})_{1.5}(Me_2SiO)_{17.5};$$

in which Me is a methyl group.

In the next place, 1470 g of H-2 and 530 g of the same polyoxyethylene glycol monoallyl ether as used in Synthetic Preparation 1 were subjected to the hydrosilation reaction in substantially the same manner as in Synthetic Preparation 1 to give 1800 g of a product, which is referred to as E-3 hereinbelow, having a viscosity of 150 centistokes. This product was a polyoxyethylene-substituted organopolysiloxane expressed by the average unit formula $$(Me_3SiO_{0.5})_{1.0}(G^1Me_2SiO_{0.5})_{1.0}(MeSiO_{1.5})_{1.5}(Me_2SiO)_{17.5};$$

in which $G^1$ is a polyoxyethylene group expressed by the formula $HO(C_2H_4O)_{10}(CH_2)_3-$.

SYNTHETIC PREPARATION 4 (COMPARATIVE)

A mixture composed of 100.8 g of hexamethyl disiloxane, 149.2 g of 1,3,5,7-tetramethyl cyclotetrasiloxane and 1750.0 g of octamethyl cyclotetrasiloxane was subjected to the siloxane rearrangement reaction in substantially the same manner as in Synthetic Preparation 1 described above to give 1900 g of an oily product, referred to as H-3 hereinbelow, having a viscosity of 40 centistokes, which was an organopolysiloxane expressed by the average unit formula $$(Me_3SiO_{0.5})_{0.5}(HMeSiO)_{1.0}(Me_2SiO)_{9.5};$$

in which Me is a methyl group.

In the next place, 1195 g of H-3 and 805 g of the same polyoxyethylene glycol monoallyl ether as used in Synthetic Preparation 1 were subjected to the hydrosilation reaction in substantially the same manner as in Synthetic Preparation 1 to give 1800 g of a product, which is referred to as E-4 hereinbelow, having a viscosity of 180 centistokes. This product was a polyoxyethylene-substituted organopolysiloxane expressed by the average unit formula $$(Me_3SiO_{0.5})_{0.5}(GMeSiO)_{1.0}(Me_2SiO)_{9.5};$$

in which $G^1$ is a polyoxyethylene group expressed by the formula $HO(C_2H_4O)_{10}(CH_2)_3-$.

SYNTHETIC PREPARATION 5 (COMPARATIVE)

The synthetic procedure was substantially the same as in Synthetic Preparation 3 described above except that, instead of the polyoxyethylene glycol monoallyl ether, 1493.4 g of the same polyoxyethylene-polyoxypropylene glycol monoallyl monomethyl ether as used in Synthetic Preparation 2 were reacted with 506.6 g of H-3 to give 1800 g of a product, which is referred to as E-5 hereinbelow, having a viscosity of 1700 centistokes. This product was a polyoxyalkylene-substituted organopolysiloxane expressed by the average unit formula $$(Me_3SiO_{0.5})_{0.5}(G^5MeSiO)_{1.0}(Me_2SiO)_{9.5};$$

in which $G^5$ is a polyoxyethylene-polyoxypropylene group expressed by the formula $MeO(C_2H_4O)_{20}(C_3H_6O)_{20}(CH_2)_3-$.

SYNTHETIC PREPARATION 6 (COMPARATIVE)

A mixture composed of 52.4 g of hexamethyl disiloxane, 77.6 g of 1,3,5,7-tetramethyl cyclotetrasiloxane and 1869.8 g of octamethyl cyclotetrasiloxane was subjected to the siloxane rearrangement reaction in substantially the same manner as in Synthetic Preparation 1 described above to give 1900 g of an oily product, referred to as H-4 hereinbelow, having a viscosity of 76 centistokes which, was an organopolysiloxane expressed by the average unit formula $$(Me_3SiO_{0.5})_{0.5}(HMeSiO)_{1.0}(Me_2SiO)_{19.5};$$

in which Me is a methyl group.

In the next place, 1470 g of H-4 and 530 g of the same polyoxyethylene glycol monoallyl ether as used in Synthetic Preparation 1 were subjected to the hydrosilation reaction in substantially the same manner as in Synthetic Preparation 1 to give 1800 g of a product, which is referred to as E-6 hereinbelow, having a viscosity of 220 centistokes. This product was a polyoxyethylene-substituted organopolysiloxane expressed by the average unit formula $$(Me_3SiO_{0.5})_{0.5}(G^1MeSiO)_{1.0}(Me_2SiO)_{19.5};$$

in which $G^1$ is a polyoxyethylene group expressed by the formula $HO(C_2H_4O)_{10}(CH_2)_3-$.

EXAMPLES 1 TO 4 AND COMPARATIVE EXAMPLES 1 TO 5

Defoaming compositions were prepared in these Examples and Comparative Examples each by uniformly blending 60 parts of an oil compound prepared by compounding 100 g of a dimethyl polysiloxane having a viscosity of 1000 centistokes and 10 g of a finely divided fumed silica filler having a specific surface area of 300 m²/g as determined by the BET method with 100 parts of one of or a combination of equal amounts of two kinds of the polyoxyalkylene-substituted organopolysiloxanes E-1 to E-6 prepared in the above described Synthetic Preparations. The polyoxyalkylene-substituted organopolysiloxanes used were:

E-1 in Example 1;
E-1 and E-2 in Example 2;

E-3 in Example 3;
E-2 and E-3 in Example 4;
E-4 in Comparative Example 1;
E-5 in Comparative Example 2;
E-6 in Comparative Example 3;
E-4 and E-5 in Comparative Example 4; and
E-5 and E-6 in Comparative Example 5.

Each of the thus prepared nine defoaming compositions was subjected to the tests for the items described before to give the results shown in the table below.

TABLE

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Defoaming power, ml of foams | 2 | 0 | 0 | 0 | 70 | 0 | 40 | 10 | 0 |
| Stability against dilution, g | 0.5 | 0.1 | 0.3 | 0.2 | 2.9 | 1.3 | 2.8 | 1.8 | 1.7 |
| Compatability with $Na_2SO_4$, g/liter | 70 | 60 | 68 | 69 | 70 | 28 | 67 | 43 | 41 |
| Flocculation temperature, °C | 85 | 68 | 83 | 67 | 82 | 36 | 81 | 55 | 54 |

What is claimed is:

1. A silicone-based defoaming composition which comprises, as a blend:
   (a) 100 parts by weight of a first organopolysiloxane represented by the average unit formula $(R_3SiO_{0.5})_x(GR_2SiO_{0.5})_y(RSiO_{1.5})_z(R_2SiO)_w,$ in which R is a monovalent hydrocarbon group having 1 to 10 carbon atoms, G is a polyoxylkylene group represented by the general formula $-R^1{}_p-O-(-C_2H_4-O-)_q-(-R^2-O-)_r-A,$ $R^1$ being a divalent hydrocarbon group having 2 to 10 carbon atoms, $R^2$ being a divalent hydrocarbon group having 3 to 10 carbon atoms, A being a hydrogen atom, a monovalent hydrocarbon group having 1 to 10 carbon atoms or an acyl group, p being 0 or 1, q being a positive integer not exceeding 100 and r being 0 or a positive integer not exceeding 50, x is a positive number in the range from 1 to 30, y is a positive number in the range from 1 to 30, z is a positive number in the range from 1 to 50 and w is a positive number in the range from 1 to 300;

(b) from 1 to 100 parts by weight of a second organopolysiloxane represented by the average unit formula $R_aSiO_{(4-a)/2},$ in which R is a monovalent hydrocarbon group having 1 to 10 carbon atoms and the subscript a is a positive number smaller than 3; and (c) from 0.05 to 25 parts by weight of a finely divided silica powder.

2. The silicone-based defoaming composition as claimed in claim 1 wherein the group denoted by R is a methyl group.

3. The silicone-based defoaming composition as claimed in claim 1 wherein the ratio of $M^E:M^T$, in which $M^E$ is the molecular weight fraction for the polyoxyalkylene groups denoted by G in the component (a) and $M^T$ is the overall molecular weight of the component (a), is in the range from 0.05 to 0.8.

4. The silicone-based defoaming composition as claimed in claim 1 wherein $R^2$ is a propylene group.

5. The silicone-based defoaming composition as claimed in claim 1 wherein the component (b) is a dimethyl polysiloxane.

6. The silicone-based defoaming composition as claimed in claim 1 wherein the amount of the component (b) is in the range from 2 to 60 parts by weight per 100 parts by weight of the component (a).

7. The silicone-based defoaming composition as claimed in claim 1 wherein the finely divided silica powder as the component (c) has a specific surface area of at least 50 m²/g.

8. The silicone-based defoaming composition as claimed in claim 1 wherein the amount of the finely divided silica powder as the component (c) is in the range from 0.1 to 20 parts by weight per 100 parts by weight of the component (a).

* * * * *